US011130614B2

(12) United States Patent
Hurt et al.

(10) Patent No.: US 11,130,614 B2
(45) Date of Patent: Sep. 28, 2021

(54) STACKABLE CONTAINER

(71) Applicant: H² Innovation GmbH, Alteglofsheim (DE)

(72) Inventors: Nathaly Hubertine Hurt, Alteglofsheim (DE); Heinrich Ullius, Alteglofsheim (DE)

(73) Assignee: H2 INNOVATION GMBH, Alteglofsheim (DE)

( * ) Notice: Subject to any disclaimer, the term of this patent is extended or adjusted under 35 U.S.C. 154(b) by 220 days.

(21) Appl. No.: 16/315,186

(22) PCT Filed: May 19, 2017

(86) PCT No.: PCT/EP2017/062139
§ 371 (c)(1),
(2) Date: Jan. 4, 2019

(87) PCT Pub. No.: WO2018/007064
PCT Pub. Date: Jan. 11, 2018

(65) Prior Publication Data
US 2019/0322417 A1  Oct. 24, 2019

(30) Foreign Application Priority Data
Jul. 6, 2016 (DE) .......................... 102016112399.4

(51) Int. Cl.
*B65D 21/06* (2006.01)
*A01G 9/02* (2018.01)
*B65D 81/26* (2006.01)

(52) U.S. Cl.
CPC ........... *B65D 21/062* (2013.01); *A01G 9/022* (2013.01); *B65D 81/262* (2013.01)

(58) Field of Classification Search
CPC ........ A01G 9/02; A01G 9/022; B65D 21/062; B65D 81/262
See application file for complete search history.

(56) References Cited

U.S. PATENT DOCUMENTS 1,689,217 A * 10/1928 White .................. B65D 21/062
   206/506
2,175,390 A * 10/1939 Harrison .............. B65D 21/062
   206/506

(Continued)

FOREIGN PATENT DOCUMENTS

CA    2485544 A1 * 12/2003  .......... B65D 21/062
DE     807084 C     6/1951

(Continued)

*Primary Examiner* — Monica L Barlow
*Assistant Examiner* — Aaron M Rodziwicz
(74) *Attorney, Agent, or Firm* — Welsh Flaxman & Gitler LLC

(57) ABSTRACT

The invention relates to a stackable container including a holding body, which has a bottom and a lateral wall, which bound a holding chamber. The holding body has stacking elements, which can be moved from a first position (P1) to a second position (P2) and which alternatively allow at least two such stackable containers to be stacked one inside the other and to be stacked one on the other. The holding body also has at least one drain opening in the region of the bottom of the holding body, and the bottom is designed to hold moisture and/or liquid present in the holding chamber and to guide the moisture and/or liquid toward the at least one drain opening. At least one of the stacking elements has a drain groove, which is designed to hold and to lead away moisture and/or liquid.

19 Claims, 6 Drawing Sheets

(56) References Cited

U.S. PATENT DOCUMENTS

| | | | | |
|---|---|---|---|---|
| 2,765,099 A * | 10/1956 | Lively | ............... | B65D 21/062 206/506 |
| 2,864,530 A * | 12/1958 | Johnson | ............... | A21B 3/133 206/506 |
| 3,169,659 A * | 2/1965 | Blackmore | ............... | B65D 21/062 206/506 |
| 3,220,603 A * | 11/1965 | Bromley | ............... | B65D 21/062 220/676 |
| 3,375,953 A * | 4/1968 | Miller, Jr. | ............... | B65D 21/062 206/506 |
| 4,984,691 A * | 1/1991 | Jones | ............... | B65D 21/062 206/506 |
| 2002/0117420 A1 * | 8/2002 | McDade | ............... | B65D 21/062 206/505 |
| 2003/0075472 A1 * | 4/2003 | McDade | ............... | B65D 21/062 206/505 |
| 2003/0222081 A1 * | 12/2003 | Apps | ............... | B65D 11/1833 220/7 |
| 2004/0195139 A1 * | 10/2004 | Wong | ............... | B65D 21/062 206/509 |
| 2005/0263424 A1 * | 12/2005 | Hassell | ............... | B65D 21/062 206/506 |
| 2012/0048767 A1 * | 3/2012 | Kapla | ............... | B65D 21/062 206/505 |
| 2012/0048821 A1 * | 3/2012 | Kapla | ............... | B65D 21/062 211/126.7 |
| 2012/0222983 A1 * | 9/2012 | Sabounjian | ............... | B65D 21/062 206/503 |
| 2014/0090294 A1 * | 4/2014 | VanWingerden | ............... | A01G 9/021 47/66.7 |

FOREIGN PATENT DOCUMENTS

| | | | | |
|---|---|---|---|---|
| DE | 8118115 U1 | 10/1982 | | |
| DE | 3521894 A1 * | 1/1987 | ......... | B65D 21/062 |
| DE | 202010000632 U1 | 4/2010 | | |
| EP | 0299657 A1 * | 1/1989 | ......... | B65D 21/062 |
| EP | 0749907 A1 | 12/1996 | | |
| FR | 1102828 A * | 10/1955 | ......... | B65D 81/261 |
| FR | 1102828 A | 10/1955 | | |
| GB | 657502 A * | 9/1951 | ......... | B65D 21/062 |
| GB | 1245100 A * | 9/1971 | ......... | B65D 21/062 |
| NL | 8104492 A | 5/1983 | | |
| WO | WO-0051900 A1 * | 9/2000 | ......... | B65D 21/062 |

* cited by examiner

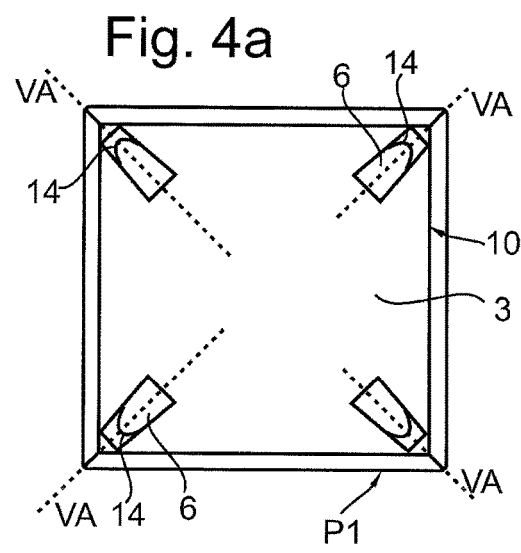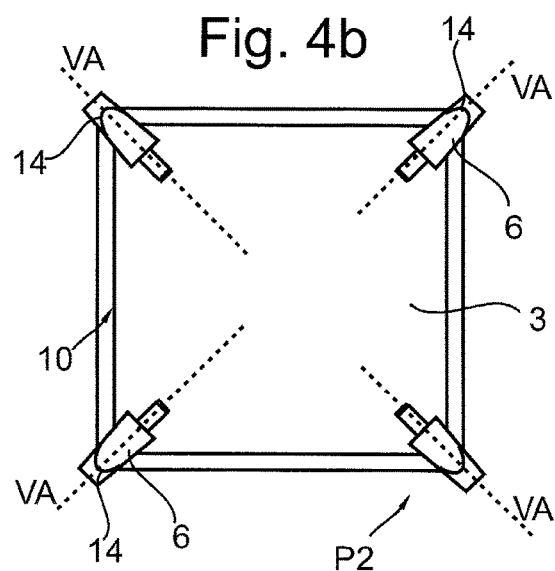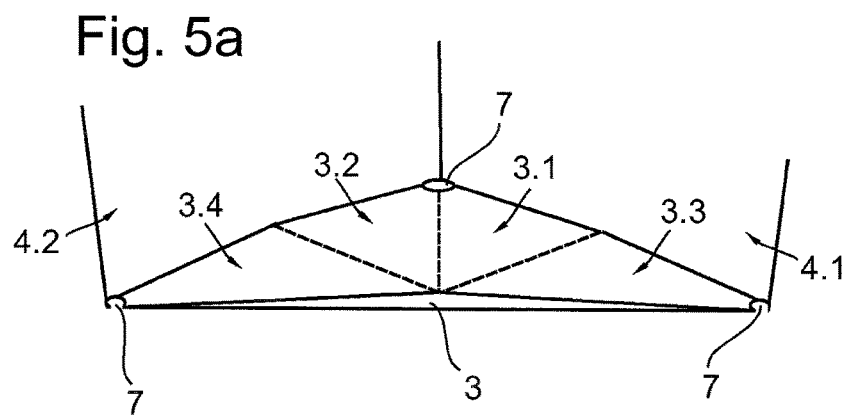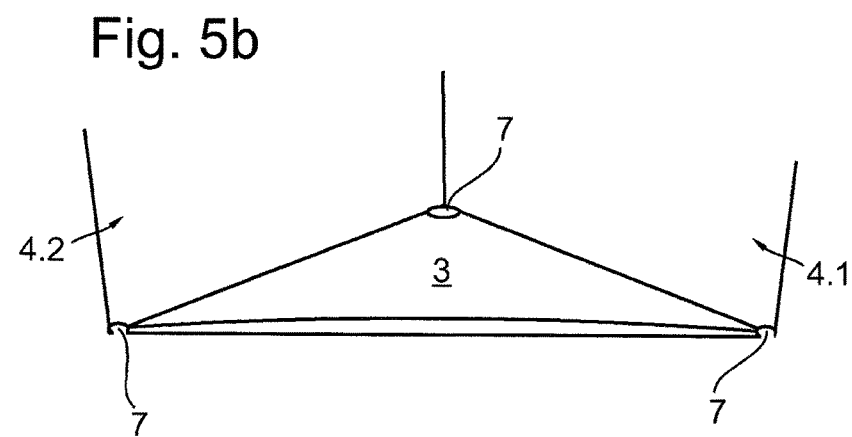

STACKABLE CONTAINER

BACKGROUND OF THE INVENTION

Technical Field

A stackable container with means for removing liquid at the bottom.

Prior Art

Containers for receiving a wide variety of goods, for example transport and storage containers for transporting and storing goods, are sufficiently known from prior art. The containers are often also designed stackable, and when in use can be stacked one on top of the other to form a container stack for storing the goods.

In order to require the least possible space in an empty state, which can also be referred to as a state of non-use, known stackable transport and storage containers are often foldable or collapsible in design. In this regard, prior art further proposes transport and storage containers designed in such a way that the transport and storage containers can be stacked one inside the other in a non-use state or in a non-use position and stacked one on top of the other in a use position.

For example, DE 20 2010 000 632 U1 describes a transport container, in which the lateral walls taper conically downward, and in which pivotable supports are provided on an upper side, which in the use position can be pivoted into a support position, in which they serve as bearings for an identical, second transport container to be stacked.

In like manner, G 81 18 115 U1 describes a container with a cross section that conically expands toward the upper edge and with feet that can be folded in under the container bottom, which in the folded out state allow the container to be placed in an identical type of container.

Depending on the intended purpose and the goods to be held, for example to be transported and/or stored, the containers can for example be closed or completely sealed, or be permeable to air and/or open at the top.

A problem is often encountered when using containers outdoors, for example for the storage of stored goods outdoors or for use in gardening or garden design. Both during storage in the open air, for example as usually necessary for firewood or log wood, and also during use as a planter, for example, a central aspect in designing corresponding containers involves ensuring that moisture and/or liquid, such as rainwater, does not accumulate. Apart from preventing waterlogging, an emphasis must here be placed on good ventilation. For the aforementioned reasons, there continues to be a demand for such containers, despite the solutions known from prior art.

SUMMARY OF THE INVENTION

Therefore, it is an object of the present invention to provide a stackable container that overcomes the disadvantages of prior art by effectively preventing moisture from accumulating in the receiving space and allowing an effective ventilation.

The present invention provides a stackable container comprising a receiving body. The receiving body comprises at least a bottom and a receiving space defined by the bottom and a lateral wall, and it comprises movably arranged stacking elements. The stacking elements can at least be moved from a first position into a second position, wherein the stacking elements allow at least two such stackable containers to be stacked one inside the other in the first position, and one on top of the other in the second position. In particular, the container according to the invention is characterized in that the receiving body has at least one drain opening in the area of the bottom, wherein the bottom of the receiving body is designed to receive the moisture and/or liquid present in the receiving space, and to guide the received moisture and/or liquid in the direction of the at least one drain opening, and that at least one of the stacking elements has a drain groove, which is designed to receive and drain moisture and/or liquid.

The stacking elements are arranged on the receiving body of the present stackable container in a movable, in particular rotational and/or pivotable, or slidable manner, and can be quickly and easily adjusted or moved in such a way as to take at least two positions. If the stacking elements are oriented in a first position, each container can hold another identically designed container or be received by the latter. In their first position, the stacking elements thus allow several identical containers to be stacked one inside the other, wherein this state of being stacked one inside the other can also be understood as the non-use state or non-use position. By contrast, the stacking elements in their second position allow a container to be stacked on top of an identical container, i.e., they thus block the stacking of at least two identical containers one inside the other. This is here also understood as the use state.

A drain opening arranged in the area of the bottom is here understood to mean that the drain opening is arranged in the bottom or at a transition from the bottom to the wall or in a section of the wall adjoining the bottom that immediately follows the transition between the bottom and wall. A drain opening arranged at the transition from the bottom to the wall can thus also have two opening sections, wherein a first opening section is formed in the bottom, and a second opening section in the wall.

Due to the drain opening formed in the area of the bottom of the receiving body in conjunction with the special configuration of the bottom and in combination with the drain grooves of the stacking elements, a removal of moisture and/or liquid from the receiving space or a draining of the receiving space can very especially advantageously take place in the use state of the stackable containers, so that the present stackable container can very especially advantageously also be used outdoors. The liquid that precipitates or accumulates in the receiving space is here guided to the at least one drain opening, and can there exit accordingly, wherein the at least one drain groove of at least one stacking element is arranged in such a way at least in the use position of the container that the liquid exiting a drain opening gets directly into the drain groove and can be drained or removed via the latter.

For example, condensed water or also penetrating rainwater can be effectively drained out of the receiving space of a container, specifically in such a way as not to introduce the effluent water into a container located adjacent and/or underneath. This yields very special advantages, for example for storing firewood or using the containers as a planter or cultivation and/or plant containers.

In preferred embodiments, the containers can also be designed in such a way that, in the use state of the containers, liquid is drained away or removed from the container stack in a targeted manner by means of provided fluid channels or fluid lines, which are correspondingly connected with the drain grooves and/or drain openings. The liquid can here be drained away either on an interior side of the container walls or on an exterior side of the container walls. Alternatively, it is also possible that the liquid accumulating in the containers of a container stack be introduced in a targeted manner in the lowermost container of a stack, and can there be collected, for example by closing the drain openings.

The receiving body preferably has several drain openings, wherein the provided drain openings are arranged next to the wall in the bottom or in a connection area of the wall on the bottom. When arranging and distributing the drain openings, it needs only be ensured that each drain opening in the use position of the container interacts with a drain groove of a stacking element, so that exiting liquid is thus correspondingly collected in a drain groove. For example, the drain openings are designed as simple boreholes, and can have a wide variety of cross sectional shapes, such as round, oval or polygonal cross sectional shapes, or be slit-shaped. The size or cross-sectional area of the drain openings is here preferably many times smaller than the area of the bottom, so that the total area of all drain openings takes up only a fraction of the bottom area, for example.

In alternative embodiments, it is also conceivable to impart a closable design to the at least one or several drain openings of a specific container within a container stack comprised of containers stacked one on top of the other. To this end, for example, simple stoppers or covers can be provided, or regulatable closures with an adjustable valve, for example which can additionally connect a drain hose and/or a tap. In particular when using the containers as a plant or cultivation container, this proves to be advantageous, since an excess of irrigation water from the containers of a container stack can be led away from the containers of a container stack, accumulated in an unplanted container, for example, and be reused from there. In this way, for example, the accumulated water can also be used for irrigating other container stacks that are adjacent or set up nearby, for example by using a suitable line or transport system for distributing the accumulated water. For example, a correspondingly designed hose and/or pump system can be used for this purpose. It goes without saying that the accumulated water can be used for irrigating containers arranged on different levels of the same or other container stacks.

In like manner, it is possible that a container with drain openings closed in this way form a water tank or water reservoir, and thus serve as the basis for an irrigation system or automatic drip irrigation, so as to irrigate the other planted containers in the container stack or also other planted containers in container stacks that are adjacent or set up nearby as needed.

Special advantages are obtained by giving the bottom a curved design. Additionally or alternatively, the bottom can preferably also be inclined in design. For example, giving the bottom an inclined or curved configuration makes it possible to ensure that the liquid or moisture present in the receiving space, which precipitates or accumulates on the bottom, flows toward the wall, and is taken up at least partially along the wall. The bottom here especially preferably has a convex curvature projecting toward the receiving space. For example, a concavely-convexly curved bottom is also possible. Depending on the arrangement and position of the drain openings, a concavely curved bottom can also be conceivable. The liquid can be made to exit the receiving space especially effectively in particular by adjusting the curvature or inclination to the position of the drain openings.

The bottom especially preferably comprises at least two adjoining, inclined bottom sections, wherein the bottom sections adjoin at a higher level point, and each fall with a prescribed angle of inclination in the direction of the wall toward a lower level point. In this preferred configuration of the bottom, the number of drain openings and the number and inclination of bottom sections can be adjusted to each other so as to ensure an effective water discharge.

In an especially preferred embodiment of the invention, the receiving body is designed essentially as a truncated pyramid with a polygonal, preferably rectangular, in particular square or preferably triangular base. As likewise preferred, the receiving body can in alternative embodiments essentially be shaped like a truncated cone, and can comprise a round or oval base. The larger of the two parallel planes or faces of the truncated pyramid or truncated cone referred to as the base here defines an imaginary upper surface of the receiving body, which is open in design and forms an upper opening of the receiving body. The smaller of the two parallel planes or faces of the truncated pyramid or truncated cone forms the bottom of the receiving body. Due to the truncated pyramid or truncated cone-shaped receiving body, several containers can especially easily be stacked one into the other in the nonuse position, wherein in particular a prescribed ratio for the size of the surfaces makes it possible to vary the degree of nesting. A truncated pyramid-shaped receiving body with a square base yields special advantages for storing firewood. Firewood with an as a rule average log length of 25 cm to 33 cm can here be especially easily and orderly layered into the receiving space if the bottom of the receiving body has an edge length of roughly 33 cm to 35 cm.

In embodiments with a truncated pyramid-shaped receiving body having a square base, the receiving body especially preferably has four lateral wall sections adjoining each other at right angles, wherein at least one first wall section has an opening. The opening can serve both as a viewing window or access opening, for example so that stored material can be introduced into the receiving space or removed from the receiving space even in the use position in a container stack. In especially preferred embodiments, the opening can be formed over nearly the entire surface of the first wall section. In particular, the opening can also perform the function of a lighting aperture when using the container as a planter. For example, leaf and flower portions of climbing or hanging plants bedded in a container partially filled with potting soil can also be guided to the outside via the through passage.

The described embodiment variants taking the form of planters can also provide trellises, which can be fastened to the containers of a container stack, and thus also allow an upwardly directed trailing of the plants. The trellises can very especially preferably here be designed in such a way that each trellis can be simultaneously fastened to several, preferably to all containers of a container stack. In these preferred variants, a trellis connected with several containers of a container stack especially advantageously simultaneously serves as a stabilizing element for stabilizing the container stack. For example, the trellis and stabilizing element can be designed like a ladder, and have two longitudinal rods essentially vertically oriented in the use position, along with several horizontal transverse rods fastened thereto. Essentially vertically running longitudinal rods is here understood to mean that the longitudinal rods run in a direction from the top down relative to a container stack, wherein the longitudinal rods can be oriented in such a way that they include an angle to the vertical ranging from 0° to 30°, preferably from 10° to 20°. The horizontal transverse rods can likewise be oriented in such a way as to include an angle with the horizontal ranging from 0° to 30° or from 10° to 20°. The longitudinal and transverse rods can essentially include any acute angle relative to each other. For example, transverse and longitudinal rods include an angle of 30° or 60°. Alternatively, the trellis and stabilizing element can also consist of trellis fences with several parallel running longitudinal rods and several transverse rods running perpendicular thereto. Also possible are configurations in which the longitudinal rods run inclined relative to each other, wherein the stabilizing element essentially comprises a V-shaped espalier. The stabilizing element can also be designed as a scissor-type espalier. In an alternative preferred embodiment, the trellis and stabilizing element can be designed as a frame-like structure, wherein the frame-like structure has a frame along with free and irregularly shaped support and/or design elements arranged inside or on the frame, for example.

In like manner, additional openings in other wall sections and/or also several openings within a single wall section can be provided. For example, the wall sections can be pre-perforated, such that a desired number and/or desired pattern of openings can be generated by breaking out area sections along the provided perforation as needed. It goes without saying that, even given a continuous wall, one or several openings can be provided in the wall. The shape of the openings can be as desired, for example, the openings can be round, oval, polygonal, heart or flower-shaped or irregularly shaped.

The openings are especially preferably arranged in an upper area of the wall that faces away from the bottom and adjoins the container edge section from above. The openings are preferably arranged in an upper half proceeding from the container edge section or in the upper two thirds of the wall surface.

As a result, the area of the wall adjoining the bottom has a closed design. In particular when using the containers as a plant or cultivation container, this makes it possible to hold potting soil or plant granulate in the lower area of the receiving space, without running the danger that the potting soil or plant granulate will be forced out. In relation to the surface of the wall or surface of the wall sections, the openings preferably take up a surface area ranging from 30% to 70%, especially preferably from 40% to 60%, and particularly preferably of roughly 50%, i.e., about half the wall surface is formed by one or more openings, and is thus open to the outside. This ensures that sufficient light can penetrate to the plants located in the receiving space.

Special advantages arise if ventilation openings are formed in the wall and/or the wall has spacers on a side facing the receiving space. Good ventilation of the receiving space is ensured in particular in combination with ventilation openings in the wall along with the top opening of the receiving body. The spacers on the wall that face the receiving space prevent the held goods, e.g., transport and storage goods, from abutting against the wall, and thus support an adequate air circulation in the receiving space. This is especially advantageous in particular for storing and drying firewood.

The containers can be made out of plastic, wood, a wood material, composite material, cardboard or any combination of the mentioned materials. Above all when using cardboard or wood or wood material, the material can here in particular preferably be coated, and preferably with a waterproof coating. When using the containers as plant or cultivation containers, special advantages are associated with the containers being made out of a transparent material.

Stiffeners in the form of ribs or the like can be molded both in the area of the bottom and also in the area of the wall. In addition, the exterior side of the wall of the receiving body can also be provided with web elements, which serve as a stop when stacking the containers one into the other in the non-use state, and thereby prevent the containers stacked one inside the other from getting stuck as the result of slipping too far into each other. The bottom of the container can also be provided with a setting edge, wherein special advantages are associated with simultaneously forming a groove for accommodating the setting edge in the area of the stacking elements, provided the latter are arranged on the upper side of the receiving body. In particular in truncated pyramid-shaped receiving bodies, edges and corners can be beveled and/or rounded in design. Special advantages are obtained by beveling the edges in the connecting areas of the wall sections, and providing them with a concave curvature, since water, for example, can run off to the outside directed or guided by the latter.

For example, the stackable container can also be provided with a cover or lid element, wherein the cover or lid element can be equipped with a lateral, outer guide groove, which is designed in such a way as to remove liquid that hits or condenses on the cover or lid element. For example, the guide groove can be set up in such a way as to enable interaction with the drain grooves of the stacking elements, so that an effective drainage can take place via the latter. It is likewise possible to also provide a collection tray, into which is placed a container or the lowermost container of a container stack.

In preferred embodiments, the lateral wall, particularly preferably the exterior side of the lateral wall, is provided with channels, seams or grooves, which are designed to catch rainwater that hits the wall, collect it and introduce it into the drain grooves of the stacking elements. The channels or seams or grooves can here be designed as an integral component of the receiving body, and already be fabricated as a unit with the receiving body, for example be formed on the wall. However, channels or seams or grooves can alternatively also be fabricated separately, and arranged on the wall of the receiving body or be joined therewith by suitable connecting devices or coupling devices.

For example, the stacking elements can be designed so as to be pivotable around a swiveling axis or displaceable in the direction of a displacement axis. The stacking elements can further be arranged on an upper side and/or a lower side of the receiving body. For example, the stacking elements can also be fastened to the receiving body, in particular to the upper side of the receiving body, by a combined retraction and folding mechanism. In such embodiment variants, each stacking element can preferably be secured to the receiving body by means of suitable guiding means, for example telescoping rails or rods, in such a way in the non-use state as to be arranged along the wall of the receiving body, preferably on the interior side of the wall, and can be folded out by a pulling/folding motion. For example, the receiving body can here additionally be provided with a kind of pocket or an insertion or push-in section for each stacking element, into which the stacking element can slide in the non-use state. Moveably arranged stacking elements are here also understood in the meaning of stacking elements being removably fastened to the receiving body. In particular, the stacking elements can here be placed in provided pockets or insertion/push-in sections of the receiving body, provided the container is in the non-use state.

In a preferred embodiment of the present invention, the upper side of the receiving body is provided with two strip-like stacking elements, wherein each strip-like stacking element has two drain grooves arranged in the area of its end regions. The strip-like stacking elements are here especially preferably pivotable in design. In especially preferred embodiments, the pivotably designed stacking elements provided on the upper side can be dimensioned in such a way as to simultaneously provide a cover. For example, either two stacking elements can here interact, so as to commonly cover the upper side opening of the receiving body, or a stacking element has dimensions adjusted to the geometry of the upper side opening in such a way as to form a cover.

In another alternative preferred embodiment, the underside of the receiving body is provided with at least two, preferably four slidably designed stacking elements, wherein each stacking element can have a respective drain groove, for example.

The stackable container is very especially advantageous when used as a storage container, for example for storing firewood or log wood. Alternatively or additionally, the stackable container can also be used as a transport container, wherein gripping elements or carrying elements can also be provided, for example, or wherein the stacking elements can simultaneously also serve as gripping devices.

Alternatively or additionally as well, the stackable container is provided for use as a plant container, for example as a cultivation or germination container, or as a planter. To this end, a prescribed quantity of potting soil or plant granulate can be placed in the container, after which seeds, seedlings, cuttings or plants can finally be introduced or planted. In particular in embodiments where the receiving body is made out of a transparent, translucent or UV-permeable material and openings are provided in the wall as lighting apertures and ventilation openings, plants can especially advantageously be cultivated, grown or blossom. The stackable containers can thus also be understood as a stackable flower bed or stackable vegetable patch.

In particular when using the stackable container as a plant container, a preferred embodiment variant involves providing at least one lamp or lamp arrangement in the area of the receiving body, which is equipped with its own power supply or with a connecting device for connection to an external power supply. The at least one lamp or lamp arrangement can here be situated in the receiving space of the receiving body or on an upper side of the receiving body, for example such that the receiving space can be illuminated.

The at least one lamp or lamp arrangement is here preferably designed to emit a light having a wavelength that promotes plant growth, and can preferably be regulated, specifically so as to emit the light over prescribed timespans and/or at prescribed times of day. For example, the lamp or lamp arrangement can be regulated in such a way as to emit light after sundown or, if it is provided that the stackable container be used as a plant container in spaces without daylight, all day or periodically at prescribed time intervals. For example, a battery or accumulator is provided for supplying power to the lamp or lamp arrangement. A solar panel in combination with a suitable storage device can further be provided for power supply purposes.

In an especially preferred embodiment of the invention, the stacking elements further have a passage communicatively connected with the drain groove for guiding the liquid collected in the drain groove in a targeted manner from a first side of the stacking elements to an opposing second side of the stacking elements. The passage is preferably designed as a funnel-shaped borehole, but can also be a passage with an essentially polygonal cross section. For example, the passage in the stacking elements causes the liquid to be guided and led in a targeted manner out of the drain grooves from an upper side or upper surface of the stacking elements, specifically the first side of the stacking elements, to a lower side, specifically the second side. Since the drain grooves of the stacking elements in a container stack will interact with the drain openings of the latter or of another container, liquid is directed from the top down essentially via the stacking elements. Depending on the passage arrangement, in particular the funnel-shaped borehole in the stacking element, the liquid can thus be led further or guided from one container to the next container situated thereunder, specifically in a way where the liquid is introduced into the receiving space of the lower container or removed or drained on the exterior side of the wall of the receiving body of the lower container. In particular when using the containers as planters, this yields special advantages.

For example, it is here likewise possible to introduce a hose or pipe or drainpipes into the funnel-shaped borehole, wherein the hose or pipe preferably has an expanding end via which the hose or pipe remains caught while recessed in the funnel-shaped borehole. Such a hose or pipe or such drainpipes can be used to form a drain system, for example to divert the liquid in a targeted manner into other containers of a container stack, or to accumulate it in other collecting vessels. For example, such collecting vessels are suitable in particular for collecting excess irrigation water, and serve as a reservoir for water that can be extracted or conveyed in a variety of ways. To this end, for example, extraction can take place manually, or a mechanical or electrical extraction can also take place through the use of corresponding means. A valve or tap can be incorporated at a suitable location or at several locations for emptying the collecting vessel.

At an interior side of the wall facing the receiving space, the receiving body advantageously has at least one fluid channel communicatively connected with the at least one drain opening for guiding the liquid, wherein a first end of the fluid channel is communicatively connected with the drain opening, and a second end of the fluid channel has an inlet opening that extends into the receiving space for the entry of the liquid. Very special advantages result from the fact that the passage interacts with the inlet opening of the fluid channel of one or several container(s) in order to guide and drain the liquid on the interior. A controlled and guided, essentially continuous direction of liquid can thereby be ensured, thus creating the possibility, in particular during use as a planter, of collecting and recycling excess irrigation water or rainwater in a targeted manner. This also makes it possible to realize an essentially automatic drip irrigation of all containers of a container stack or even adjacent container stacks, and this specifically regardless of the height at which the containers are located.

It is very especially preferable that the collecting chamber further incorporate at least one shelf, wherein the shelf is mounted at a prescribed position in the receiving space by means of retaining webs designed for this purpose and provided on the wall of the receiving body. For example, when using the containers as planters, it is also possible to provide a water-permeable shelf in the receiving space, on which the potting soil or plant granulate is stored. As a result, a chamber can be created underneath the shelf, for example in which irrigation water can be collected by closing the drain openings.

The present invention also comprises an arrangement of containers stacked one on top of the other as defined above, wherein at least one first container is situated underneath one second container, and wherein the second container is mounted on the first container by means of the stacking elements aligned in a second position.

In a preferred embodiment of the arrangement of containers stacked one top of the other, the stacking elements of the first container are arranged on the upper side of the receiving body, and the drain grooves of the stacking elements of the first container interact with the drain openings of the second container to lead moisture and/or liquid out of the receiving space of the first container.

The containers stacked one on top of the other in the arrangement are preferably designed for leading the liquid out of the container stack on the interior side, wherein at least the receiving body of the first container has at least one fluid channel with an inlet opening on an interior side of the wall facing the receiving space for guiding and draining the liquid on the interior side, wherein the stacking elements further have a passage communicatively connected with the drain groove for guiding the liquid collected in the drain groove in a targeted manner from the first side of the stacking elements to an opposing second side of the stacking elements, and wherein the passage interacts with the inlet opening of the fluid channel of the first container in such a way that the liquid is introduced into the fluid channel of the first container via the passage of the stacking elements.

As an alternative, it is also possible to lead away the water outside of the receiving body on the outside, for example along discharge channels or discharge grooves on an exterior surface or exterior side of the wall provided for this purpose. Depending on the application and configuration, this can be advantageous for the overall concept of the container system.

In the arrangement, at least two stacks of containers are preferably situated one next to the other, wherein connecting and securing elements are also provided, so as to connect the stacks situated one next to each other and secure them relative to each other.

BRIEF DESCRIPTION OF THE DRAWINGS

The invention will be explained in greater detail below based on exemplary embodiments in conjunction with the drawings. In the drawings:

FIG. 4a is a schematic, underside view of the bottom of the receiving body according to a preferred embodiment of the invention, with stacking elements situated on the underside of the receiving body in their first position;

FIG. 4b is a schematic, underside view of the bottom of the receiving body of FIG. 4a with the stacking elements in their second position;

FIG. 5a is part of a vertical section of a preferred embodiment of the receiving body in the area of the bottom;

FIG. 5b is part of a vertical section of another preferred embodiment of the receiving body in the area of the bottom;

DETAILED DESCRIPTION OF THE INVENTION

Figure 1:
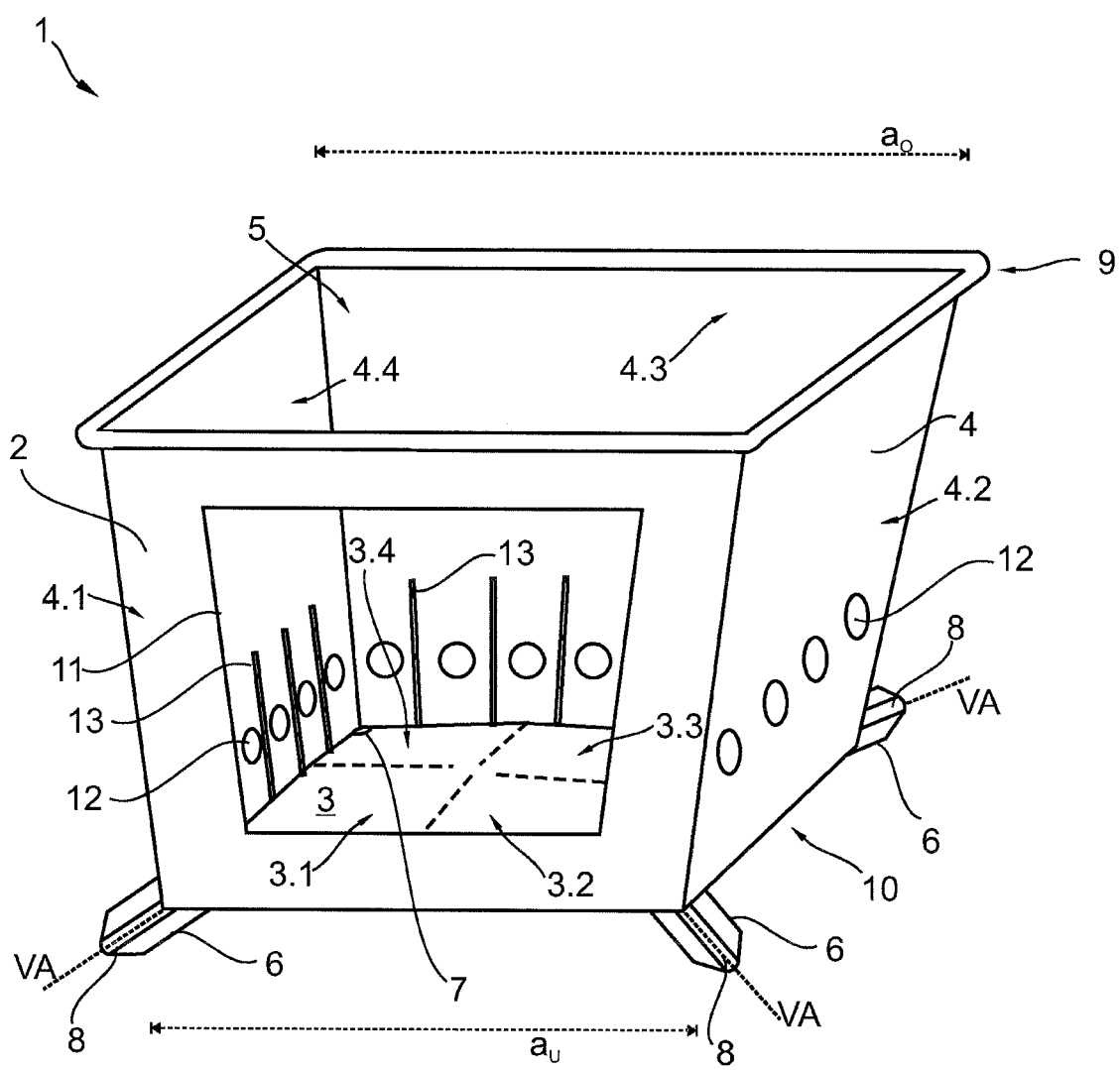
FIG. 1 is a perspective view of an embodiment of a container according to the present invention.
Figure 2:
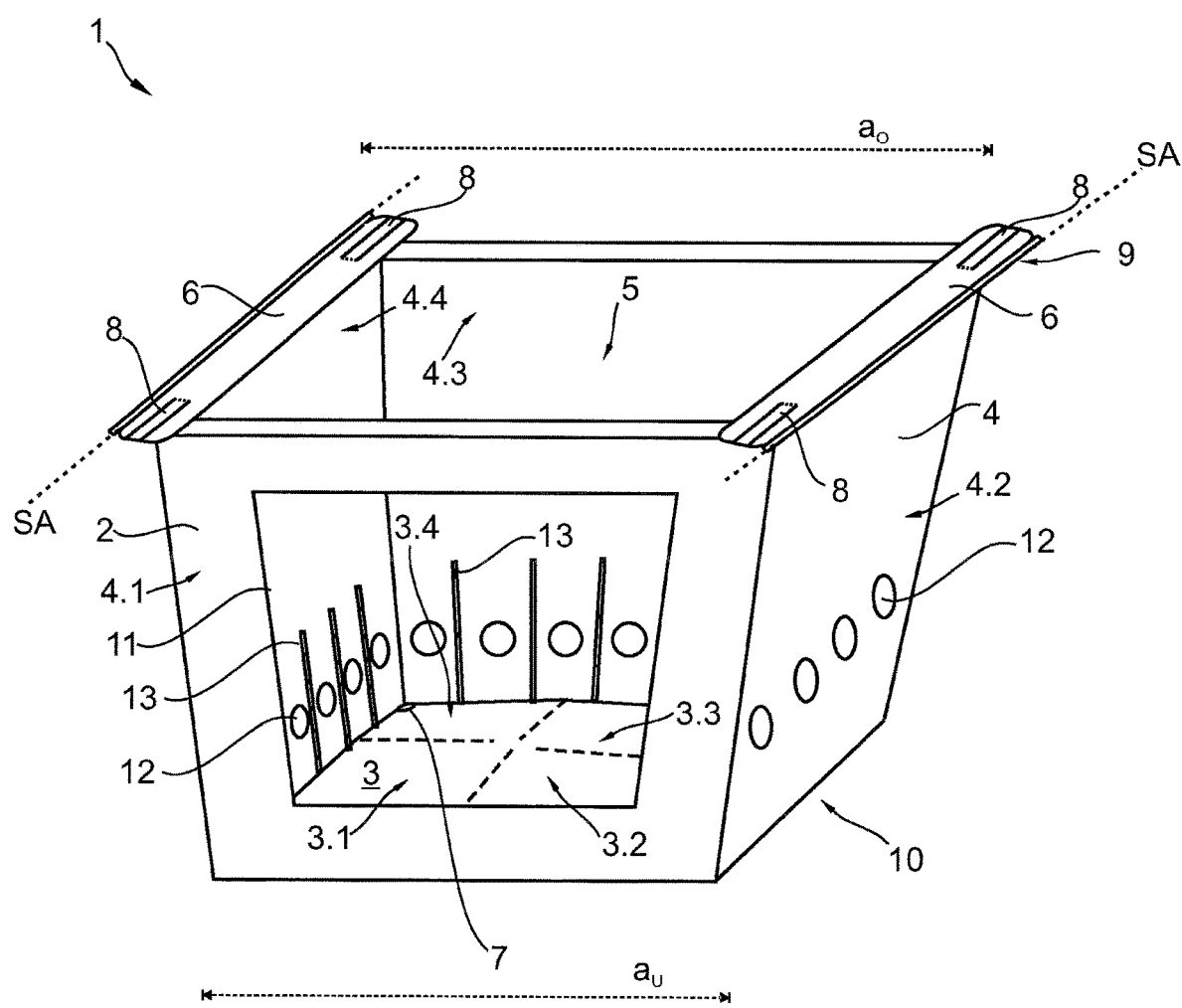
FIG. 2 is a perspective view of an alternative embodiment of a container according to the present invention.

FIGS. 1 and 2 each present a schematic, perspective view of an embodiment of a stackable container 1 according to the present invention. The stackable container 1 comprises a receiving body 2 with a bottom 3 and with a receiving space 5 for the goods to be received, in particular the transport and storage goods to be transported and/or stored, which receiving space 5 is defined by a lateral wall 4. The essentially continuously designed bottom forms an underside 10 of the receiving body 2. An upper side 10 of the receiving body lying opposite the underside 10 has an open design. The stackable container 1 in the examples shown is thus an uncovered transport and storage container 1 open at the top.

In order to enable the stacking of identical stackable containers 1, the receiving body 2 has movably arranged stacking elements 6, which can be moved from a first position P1 not depicted in FIGS. 1 and 2 into a second position P2 as depicted on FIGS. 1 and 2, in which they permit the stacking of identical containers 1 one on top of the other. By contrast, identical containers 1 can be stacked one inside the other in the first position P1 (e.g., see FIGS. 3b and 3d) of the stacking elements 6.

The underside 10 of the receiving body 2 shown on FIG. 1 has four stacking elements 6, which are arranged so that they can be moved along a respective displacement axis VA, while the upper side 9 of the receiving body 2 depicted on FIG. 2 has two strip-like stacking elements 6 that can be pivoted around a swiveling axis SA.

The receiving body 2 in the examples shown is essentially shaped like a truncated pyramid with a square base, wherein the larger base of the truncated pyramid is defined by an imaginary upper-side surface on the upper side 10, and wherein the bottom 3 of the receiving body 2 forms the smaller covering surface of the truncated pyramid. In the examples shown, a lower edge length $a_u$ of the receiving body 2 measures roughly 33 cm, and an upper edge length $a_o$ of the receiving body 2 measures roughly 40 cm. Because the receiving body 2 is configured like a truncated pyramid, identical containers 1 can be stacked one inside the other in an especially simple manner, provided the stacking elements 6 are aligned in the first position P1 provided for this purpose.

For example, the wall 4 of the receiving body 2 comprises four lateral wall sections 4.1, 4.2, 4.2, 4.4 adjoining each other at right angles, wherein a first wall section 4.1 that defines the front side of the receiving body 2 has an opening 11. Ventilation openings 12 are provided in a second and fourth wall section 4.2, 4.4 defining the sides of the receiving body 2 as well as in a third wall section 4.3 defining the rear side, and are designed to improve air circulation in the receiving space 5. The sides of the wall sections 4.2, 4.3, 4.4 facing the receiving space further each have several spacers 13 in the form of webs.

In the area of the bottom 3, the receiving body 2 comprises four drain openings 7, each of which is formed in a respective one of the four corners of the bottom 3, and there in a respective area connecting the wall 4 and bottom 3. The bottom 3 comprises four adjoining, inclined bottom sections 3.1, 3.2, 3.3, 3.4, wherein the inclined bottom sections 3.1, 3.2, 3.3, 3.4 are arranged relative to each other in such a way that the bottom 3 has a higher level in an area around the midpoint, and a lower level at each of the four corners. Each of the bottom sections 3.1, 3.2, 3.3, 3.4 tapers at a respective prescribed angle of inclination from the higher level in the middle in the direction of a corner toward the lower level. Moisture or liquid present in the receiving space 5 is thus led in the direction of the drain openings 7 owing to the configuration of the bottom 3.

According to the invention, the stacking elements 6 are equipped with drain grooves 8, wherein the drain grooves 8 and drain openings 7 of the receiving body 2 are arranged relative to each other in such a way that the moisture or liquid exiting the drain openings 7 directly gets into the drain grooves 8. Therefore, the drain grooves 8 interact with the drain openings 7 of the receiving body 2 in such a way that the moisture or liquid exiting the drain openings 7 can be drained away via the drain grooves 8.

Figure 7A:
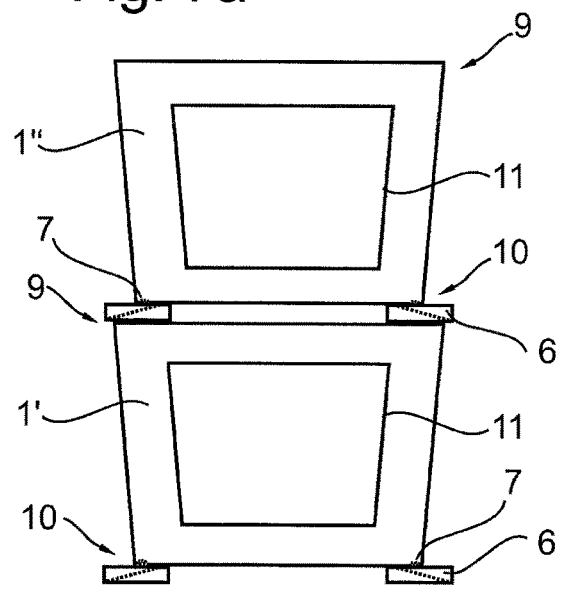
FIG. 7a is an arrangement of two containers stacked one on top of the other.
Figure 7B:
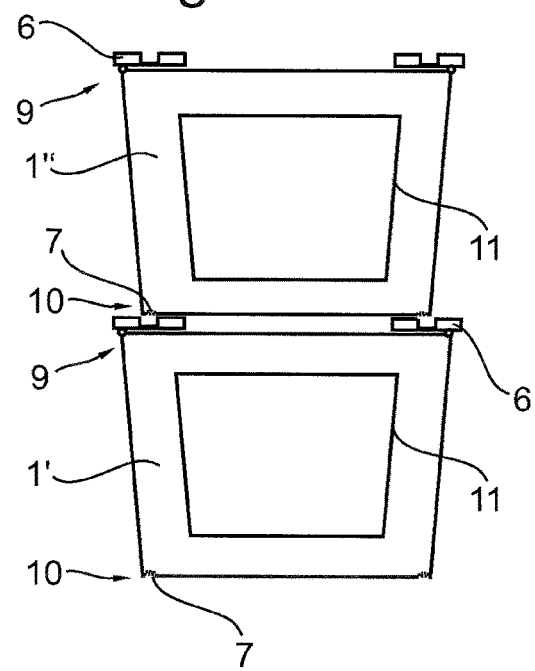
FIG. 7b is another arrangement of two alternative containers stacked one on top of the other.

In the example on FIG. 2, however, moisture or liquid is drained away by the drain grooves as described above only in a stack of at least two containers 1 stacked one on top of the other, as shown on FIG. 7*b*.

The present container 1 is especially advantageously suited for storing and transporting firewood, in particular firewood logs or kindling, which can be brought in for storage and drying in the receiving space 5 of the transport and storage containers 1 and piled up log by log just as in a conventional woodshed. The wood logs can here be introduced either via the upper-side opening on the upper side 9 of the receiving body 2, or also via the opening 11 formed in the first wall section 4.1. The dimensions of the receiving body 2 measuring roughly 40 cm or roughly 33 cm for its upper and lower edge lengths $a_o$, $a_u$ are adapted for cut wood logs with a log length of roughly 25 to 33 cm.

The spacers 13 on the sides of the wall sections 4.2, 4.3, 4.4 facing the receiving space 5 prevent the wood logs from extensively abutting against the wall 4. The open configuration of the transport and storage containers 1 combined with the ventilation openings 12 in the wall sections 4.2, 4.3, 4.4 as well as the opening 11 in the front side ensures an effective ventilation and air circulation in the receiving space 5, which counteracts mold formation and rot, and positively influences the drying of the wood.

As a result of the described drainage via the interacting drain grooves 8 and drain openings 7, for example, condensation water or possibly even penetrating rainwater can be drained away without any problem. The bottom with an essentially closed design makes it possible to simultaneously use the container 1 to transport firewood into the living space without dirt, as well as to store it cleanly near the furnace until it is ultimately consumed.

The present container 1 is especially advantageously also suitable for use as a plant container, for example for germinating or cultivating seedlings or cuttings, or also as a planter for green plants or flowers. The described drainage via the interacting drain grooves 8 and drain openings 7 makes it possible to effectively counteract waterlogging. In particular the use of a transparent material for fabricating the containers 1 in combination with the openings 11 and ventilation openings 12 provided in the wall 4 ensure a sufficient incidence of light in the receiving space 2 and a sufficient ventilation of the receiving space 2. Therefore, the present container 1 can also be understood as a stackable vegetable patch or flower bed. For example, a stack of the present containers 1 can likewise form a green separating element or a green separating wall given planted containers 1 stacked one on top of the other by virtue of passing the leaves and flowers of the plants via the through passages 11 toward the outside, and having them hang down or trail on the exterior side of the receiving body 2.

Figure 3A:
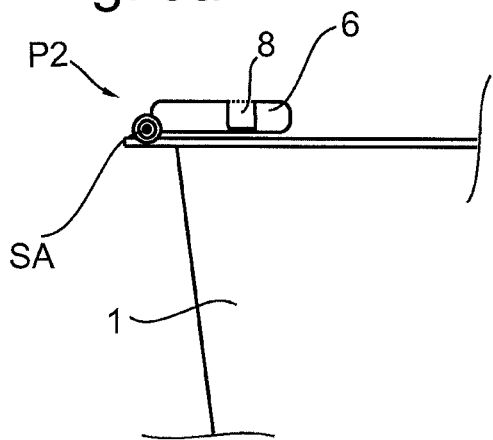
FIG. 3a is a schematic partial view of an embodiment as illustrated in FIG. 2 of a container with a stacking element aligned in a second position.
Figure 3B:
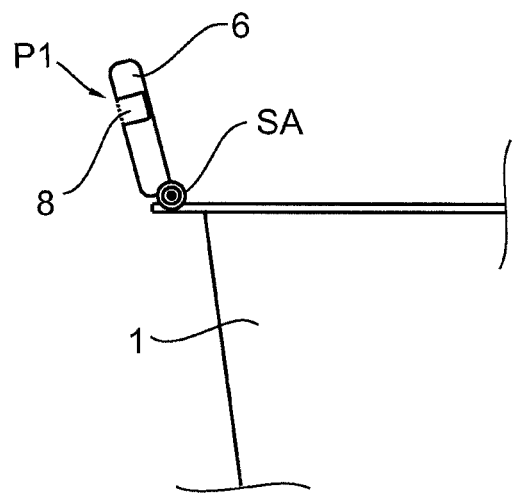
FIG. 3b is the partial view of the container of FIG. 3a with a stacking element aligned in a first position.
Figure 3C:
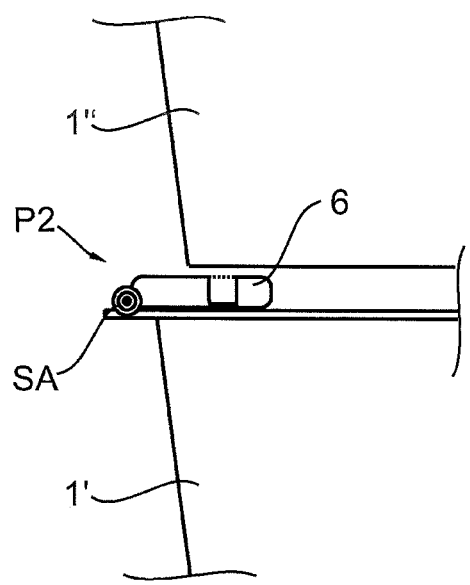
FIG. 3c is a schematic partial view of two containers stacked one on top of the other.
Figure 3D:
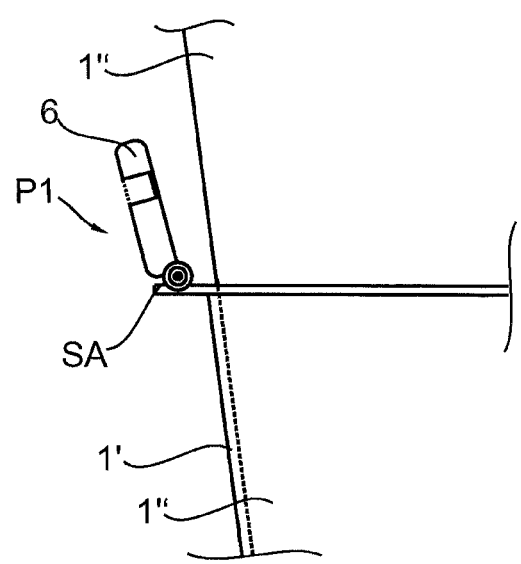
FIG. 3d is a schematic partial view of two containers stacked one inside the other.

FIGS. 3*a* and 3*b* present a schematic view from the back of a respective upper-side detail of an embodiment of the container 1 corresponding to FIG. 2. The pivotable, strip-like stacking element 6 can be swiveled from the first position P1 shown on FIG. 3*b* around the swiveling axis SA into the second position P2 shown on FIG. 3*a*. In the first position P1 of the stacking element 6, identical containers 1 can be stacked one inside the other. FIG. 3*d* illustrates two containers 1 stacked one inside the other, wherein a second container 1" is accommodated in a first container 1' located underneath. In their second position P2, the stacking elements 6 make it possible to stack identical containers 1 one on top of the other. As evident from FIG. 3*c*, the stacking element 6 of a first container 1' comprises a support for the bottom 3 of a second container 1" arranged on the first container 1', as may also be gleaned from FIG. 7*b*.

FIGS. 4*a* and 4*b* present a schematic, underside view of the receiving body 2 of an embodiment of the transport and storage container 1 corresponding to FIG. 1. The movable stacking elements 6 can be moved from the first position P1 shown on FIG. 4*a* into the second position P2 shown on FIG. 4*b* by sliding along a respective displacement axis VA. For example, the stacking elements 6 can be fixed in place in each of the two positions P1 and P2 via latching with a locking hook.

As also evident from FIG. 7*a*, the stacking elements in their second position P2 form supporting feet, which are designed to be supported against an upper edge of a container 1 situated underneath. In order to ensure an especially reliable support on a container 1 situated underneath, the respective underside of the stacking elements 6 in the example shown has a shoulder 14, which serves as a contact surface for the upper edge of a container 1 situated underneath, and prevents slippage.

FIGS. 5*a* and 5*b* schematically illustrate details of a vertical section of a respectively preferred embodiment of the receiving body 2 in the area of the bottom 3. The bottom of FIG. 5*a* has a plurality of inclined bottom sections 3.1, 3.2, 3.3, 3.4, which are arranged relative to each other in such a way as to yield a slope in the direction of the wall 4 proceeding from the middle of the bottom area, wherein the inclined bottom sections 3.1, 3.2, 3.3, 14 adjoin each other along imaginary lines arranged in a star shape. The drain openings 7 are situated at the four corners of the square bottom 3, wherein the four corners form a deeper level point, and wherein the respective wall sections 4.1, 4.2, 4.3, 4.4 of the wall 4 also adjoin each other in the area of the corners. The inclined bottom sections 3.1, 3.2, 3.3, 3.4 are arranged relative to each other or inclined against each other in such a way that moisture or liquid that impacts the bottom 3 flows in the direction of the drain openings 7. In contrast to the example of FIG. 5*a*, the bottom of FIG. 5*b* is curved in design.

Figure 6A:
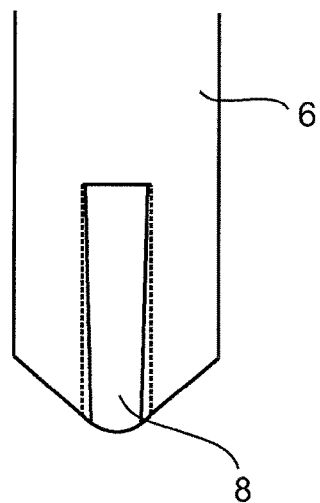
FIG. 6a is a topview of a section of a stacking element.
Figure 6B:
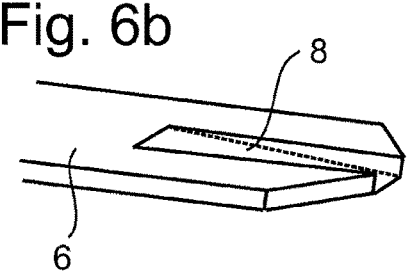
FIG. 6b is the section of the stacking element of FIG. 6a in a perspective view.

FIGS. 6*a* and 6*b* illustrate the drain grooves 8 formed in the stacking elements 6, which have a slope in the direction of the free end of the stacking element 6, so as to ensure the most effective drainage or most effective outflow of water possible.

Figure 8A:
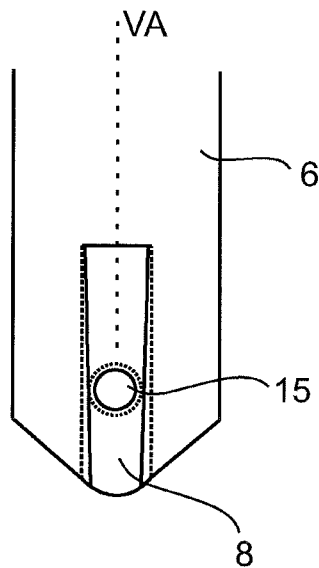
FIG. 8a is a section of another embodiment of a stacking element viewed from above.
Figure 8B:
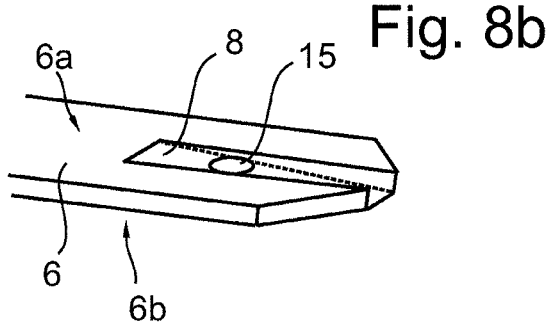
FIG. 8b is the section of the stacking element of FIG. 8a in a perspective view.
Figure 8C:
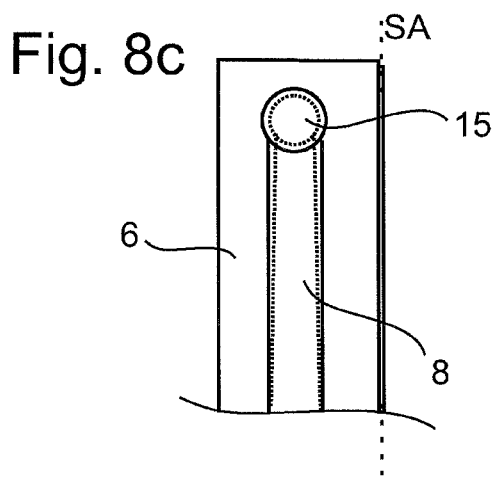
FIG. 8c is a section of an alternative embodiment of a stacking element viewed from above.

FIGS. 8*a* to 8*c* present embodiments of stacking elements 6, which apart from the drain groove 8 have a passage 15 in the form of a funnel-shaped borehole that is communicatively connected thereto. The funnel-shaped borehole 15 is designed to conduct liquid that collects in the drain groove 8 from a first side 6*a* forming the upper side of the stacking elements 6 to an opposing second side 6*b* that forms the underside of the stacking elements 6. The stacking element 6 on FIGS. 8*a* and 8*b* is an example for a stacking element 6 that can be moved along the displacement axis VA and is preferably secured to the underside of a container, and the stacking element 6 on FIG. 8*c* is an example for a strip-like stacking element 6 that can be pivoted around the swiveling axis SA and is preferably secured to the upper side of a container.

Figure 9A:
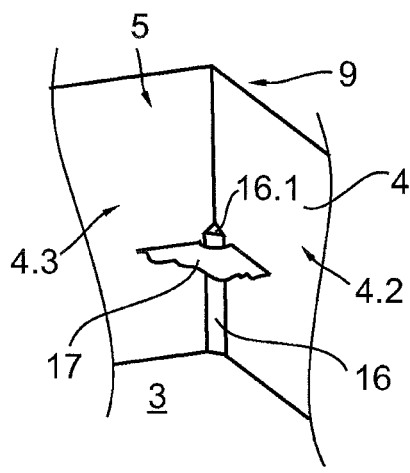
FIG. 9a is an interior view of the corner area of an embodiment of the container.
Figure 9B:
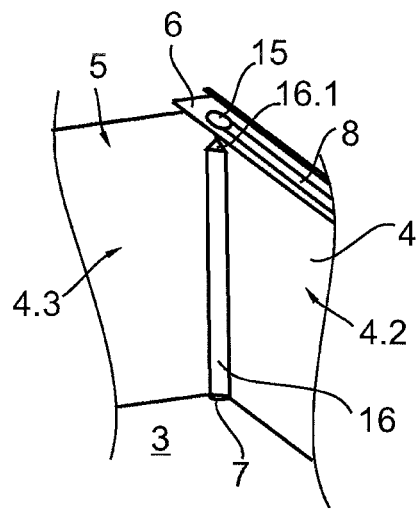
FIG. 9b is an interior view of the corner area of another embodiment of the container.

In an interior view of a corner region of the receiving containers 2, FIGS. 9*a* and 9*b* show a respectively preferred embodiment of the containers 1 with a fluid channel 16 arranged on the interior side of the wall 4 facing the receiving space 5 for guiding and conducting liquid in a targeted manner. The fluid channel 16 is communicatively connected with the drain opening 7 at a first end, and has an inlet opening 16.1 for the entry of liquid that extends into the receiving space 5 at a second end.

Also provided in the example on FIG. 9*a* is a shelf 17, only a section of which is depicted. For example, the shelf 17 is permeable to water or liquid, and mounted in the receiving space 5 in a prescribed position by means of holding webs designed for this purpose and provided on the wall 4 of the receiving body 2, wherein the shelf 17 forms an insertion plane that runs essentially parallel to the bottom 3 and is spaced apart from the latter. The fluid channel 16 completely covers the drain opening 7 (not visible on FIG. 9*a*) in the area of the bottom 3 with its one end, and extends from the bottom 3 in the direction toward the upper side 9 of the receiving body 2, specifically in such a way that the fluid channel 16 protrudes upwardly over the insertion plane, and the inlet opening 16.1 of the fluid channel 16 is arranged above the shelf 17. In this exemplary embodiment, for example, water can accumulate up to the height of the inlet opening 16.1 of the fluid channel 16, and hence essentially until just above the shelf 17. As soon as the liquid level has reached the height of the inlet opening 16.1, the water or liquid runs over the inlet opening 16.1 into the fluid channel 16, and from there through the drain opening 7 and out of the receiving body 2. In this embodiment, the fluid channel 16 can be understood as a quasi-overflow tunnel. A fluid channel 16 is preferably arranged in each corner of a container 1 with an essentially rectangular basic shape.

The example shown on FIG. 9*b* illustrates how the passage 15 in the stacking element 6 interacts with the fluid channel 16 of the container 1 for guiding and leading away the liquid on the interior. Liquid that accumulates in the drain groove 8 of the stacking element 6 can be introduced via the passage 15 into the receiving space 5 of the receiving body 2, wherein the passage 15 is preferably arranged in such a way that the liquid penetrates or is introduced into the receiving space 5 along the interior side of the wall 4 facing the receiving space 5 in the corner region where the wall sections 4.2, 4.3 adjoin each other, and finally penetrates into the fluid channel 16 via the inlet opening 16.1. From there, the liquid is guided in the direction of the drain opening 7 in the area of the bottom 3, and exits the receiving body 2 through the latter. If the container 1 has been stacked onto a container situated underneath in a container stack, the path taken by the liquid continues analogously, in that the liquid, upon exiting the drain opening 7 of the container, is received by the drain groove 8 of a container 1 located underneath, and from there is further introduced into its receiving space 5. For example, this makes it possible to realize a continuous liquid conduction or a flow channel from the top down throughout the entire container stack, specifically from the uppermost to lowermost container 1 of a container stack, wherein the liquid is essentially guided inside of the receiving body, so that contaminants in the outer area of the wall 4 of the containers 1 can be effectively prevented.

REFERENCE LIST

1 Container
1', 1" First or second container
2 Receiving body
3 Bottom
3.1 Bottom section
3.2 Bottom section
3.3 Bottom section
3.4 Bottom section
4 Wall
4.1 Wall section
4.2 Wall section
4.3 Wall section
4.4 Wall section
5 Receiving space
6 Stacking element
6*a* First side of the stacking element
6*b* Second side of the stacking element
7 Drain opening
8 Drain groove
9 Upper side
10 Underside
11 Opening
12 Ventilation opening
13 Spacer
14 Shoulder
15 Passage
16 Fluid channel
16.1 Inlet opening
17 Shelf
$a_o$ Upper edge length
$a_u$ Lower edge length
P1 First position
P2 Second position
SA Swiveling axis
VA Displacement axis

The invention claimed is:

1. A stackable container comprising;
a receiving body having at least one bottom and a receiving space defined by the bottom and a lateral wall, wherein the receiving body comprises movably arranged stacking elements;
the movably arranged stacking elements are movable from a first position into a second position, wherein the movably arranged stacking elements allow at least two stackable containers to be stacked with one stackable container inside another stackable container in the first position, and one stackable container on top of another stackable container in the second position;
the receiving body has at least one drain opening in an area of the bottom, wherein the bottom of the receiving body receives moisture and/or liquid present in the receiving space, and guides the moisture and/or the liquid in a direction of the at least one drain opening, and that at least one of the stacking elements has a drain groove, which receives and drains the moisture and/or the liquid, and wherein the stacking elements further comprise a passage opening, extending from an upper side to a lower side of the stacking element; communicatively connected with the drain groove for guiding the moisture and/or the liquid accumulated in the drain groove in a targeted manner from an upper first side of the stacking elements to an opposing lower second side of the stacking elements.

2. The stackable container according to claim 1, wherein the at least one drain opening interacts with the drain groove of one or several stackable containers to drain the moisture and/or the liquid present in the receiving space.

3. The stackable container according to claim 1, wherein the receiving body has a plurality of drain openings, the drain openings are adjacent to the wall in the bottom and/or in an area connecting the wall to the bottom.

4. The stackable container according to claim 1, wherein the bottom is inclined or curved.

5. The stackable container according to claim 4, wherein the bottom comprises at least two adjoining, inclined bottom sections, wherein the at least two adjoining, inclined bottom sections adjoin each other at a higher level point, and each taper to a deeper level point at a prescribed angle of inclination in a direction of the wall.

6. The stackable container according to claim 1, wherein the receiving body is essentially a truncated pyramid with a polygonal square base, and comprises adjoining lateral wall sections, or that the receiving body is shaped like a truncated cone with a round or oval base, wherein at least one opening is formed in the wall of the receiving body.

7. The stackable container according to claim 1, wherein ventilation openings are formed in the wall and/or that the wall has spacers on a side facing the receiving space.

8. The stackable container according to claim 1, wherein the stacking elements are movable or pivoted around a swiveling axis.

9. The stackable container according to claim 1, wherein the stacking elements are arranged on an upper side and/or an underside of the receiving body.

10. The stackable container according to claim 9 wherein the upper side of the receiving body is provided with two strip-like stacking elements, wherein each of the stacking elements has at least two drain grooves arranged in an area of end regions of each of the stacking elements.

11. The stackable container according to claim 9 wherein the underside of the receiving body is provided with four slidably configured stacking elements, wherein each of the four slidably configured stacking elements has at least one drain groove.

12. The stackable container according to claim 1, wherein the stackable container is configured for use as a storage container, a transport container and/or a plant container.

13. The stackable container according to claim 1, wherein at an interior side of the wall facing the receiving space, the receiving body has at least one fluid channel communicatively connected with the at least one drain opening for guiding the liquid, wherein a first end of the at least one fluid channel is communicatively connected with the drain opening, and a second end of the fluid channel has an inlet opening for the entry of the liquid.

14. The stackable container according to claim 13 wherein the passage interacts with the inlet opening of the fluid channel of one or several stackable containers in order to guide and drain the liquid in the interior.

15. The stackable container according to claim 1, wherein at least one shelf is provided within the receiving space, wherein the shelf is mounted at a position in the receiving space by retaining webs provided on the wall of the receiving body.

16. An arrangement of stackable containers according to claim 1, comprising at least two stackable containers stacked with a first stackable container on top of a second stackable container in a container stack, wherein the first stackable container is arranged underneath the second stackable container, and that the second stackable container is supported on the first stackable container by the stacking elements aligned in a second position.

17. The arrangement according to claim 16 wherein the stacking elements of the first stackable container are arranged on an upper side of the receiving body, and the drain grooves of the stacking elements of the first stackable container interact with the drain openings of the second stackable container to drain the moisture and/or the liquid out of the receiving space of the second container.

18. The arrangement according to claim 16, wherein the first stackable container and the second stackable container are stacked for draining the liquid out of the container stack on an interior side, wherein at least the receiving body of the first stackable container has at least one fluid channel with an inlet opening on an interior side of the wall facing the receiving space for guiding and draining the liquid on the interior side, wherein the stacking elements further have a passage communicatively connected with the drain groove for guiding the liquid collected in the drain groove in a targeted manner from a first side of the stacking elements to an opposing second side of the stacking elements, and wherein the passage interacts with the inlet opening of the fluid channel of the first stackable container in such a way that the liquid is introduced into the fluid channel of the first stackable container via the passage of the stacking elements.

19. The arrangement according to claim 16, further including at least two stacks of containers arranged one next to the other, each of the at least two stacks of containers comprising the first stackable container and the second stackable container with the first stackable container on top of the second stackable container, and wherein connecting and securing elements are provided, so as to connect the at least two stacks of containers arranged one next to each other and secure them relative to each other.

* * * * *